United States Patent [19]

Pond et al.

[11] 4,216,439
[45] Aug. 5, 1980

[54] APPARATUS FOR ACCOMPLISHING SPECTRAL LINE SELECTION IN LASERS BY RETROREFLECTIVE FEEDBACK

[75] Inventors: Charles R. Pond, Federal Way; Richard B. Hall, Bellevue, both of Wash.

[73] Assignee: The Boeing Company, Seattle, Wash.

[21] Appl. No.: 903,762

[22] Filed: May 8, 1978

[51] Int. Cl.² .............................................. H01S 3/08
[52] U.S. Cl. .............................................. 331/94.5 C
[58] Field of Search ................................... 331/94.5 C

[56] References Cited

U.S. PATENT DOCUMENTS

| | | | |
|---|---|---|---|
| 3,443,243 | 5/1969 | Patel | 331/94.5 C |
| 3,928,817 | 12/1975 | Chodzko | 331/94.5 C |

*Primary Examiner*—William L. Sikes
*Attorney, Agent, or Firm*—Cole, Jensen & Puntigam

[57] ABSTRACT

In one application, the apparatus is used with unstable laser resonators which include a gain region defined by a concave mirror and a convex mirror. The apparatus includes a spectral line selection medium, such as a multiple band pass filter or a multiple diffraction grating, which is located so that the laser beam directed out of the laser gain region impinges thereon. A retroreflector is positioned so that the spectral lines selected by the line selection medium are reflected back into the laser gain region along the propagation path of the incident beam, resulting in a lockup of the laser at the selected spectral lines.

6 Claims, 5 Drawing Figures

APPARATUS FOR ACCOMPLISHING SPECTRAL LINE SELECTION IN LASERS BY RETROREFLECTIVE FEEDBACK

BACKGROUND OF THE INVENTION

The present invention relates generally to the laser art, and more specifically concerns apparatus to accomplish retroreflective feedback of certain spectral lines of a generated laser beam back into the gain region of the laser.

A laser will emit light over a known range of frequencies in specific spectral regions referred to as spectral lines. This is a term borrowed from conventional optics and refers to relatively narrow, separate bands or groups of frequencies. These spectral lines define the pattern of the emitted radiation.

In a laser emission spectrum, each spectral line is a band of radiation, concentrated at several specific frequencies within the spectral line band. These specific frequencies are referred to as the modes of a spectral line.

When a laser beam having a spectrum which includes a number of spectral lines is directed through the atomsphere to a particular target, the energy at one or more of the spectral lines is absorbed to some degree by the atmosphere. Certain spectral lines are almost entirely absorbed, while others are reduced to a lesser extent. This phenomenon of atmospheric absorption of particular laser wavelengths directly reduces the amount of energy delivered to the target, and is hence undesirable.

In addition to this direct reduction of laser energy, atmospheric absorption of spectral lines indirectly reduces the amount of energy in the propagated laser beam delivered to the target. The indirect reduction is caused by a phenomenon referred to as thermal blooming, in which the absorbed laser energy causes a heating of the atmosphere, which leads to a decrease in atmospheric density. The index of refraction of the atmosphere changes in accordance with a decrease in density, so a decrease in atmospheric density will lead to a diverging laser beam. This causes a substantial decrease in the intensity of the laser beam at the target. Any decrease in beam intensity at the target is very serious, and must be avoided or decreased as much as possible.

Accordingly, a general object of the present invention is to provide a laser line selection apparatus which overcomes one or more of the disadvantages of the prior art stated above.

It is another object of the present invention to provide such an apparatus which locks a laser onto spectral lines which are not absorbed by the atmosphere.

It is an additional object of the present invention to provide such an apparatus which is capable of selecting any one or several spectral lines within the laser spectrum.

It is a further object of the present invention to provide such an apparatus which does not decrease the original power and/or efficiency of the laser.

SUMMARY OF THE INVENTION

Accordingly, the present invention is an apparatus for use with a laser having a laser resonator. The apparatus locks the laser to selected spectral lines. It includes selecting and reflecting means which is positioned relative to the resonator such that a propagating laser beam which has made a number of passes along a gain path in the resonator impinges thereon. The selecting and reflecting means selects at least one spectral line from the frequency spectrum of the laser beam and reflects that one spectral line back into the resonator along the gain path.

DESCRIPTION OF THE DRAWINGS

A more thorough understanding of the invention may be obtained by a study of the following detailed description taken in connection with the accompanying drawings in which.

DESCRIPTION OF THE PREFERRED EMBODIMENT

Figure 1:
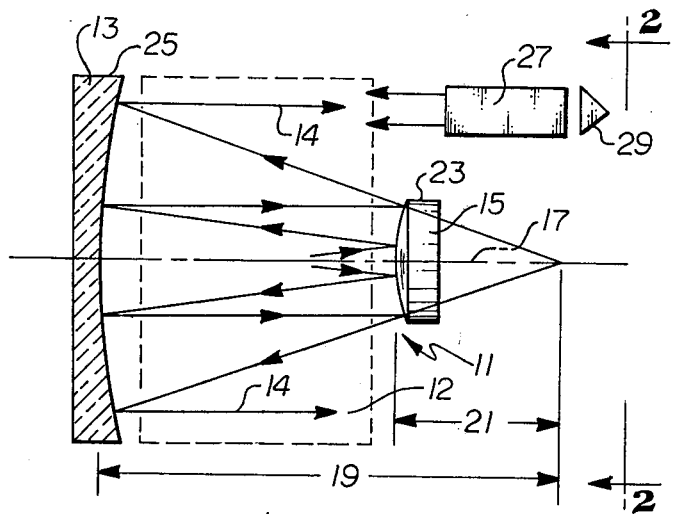
FIG. 1 is a side elevational view of the gain region of a laser, including a schematic view of the apparatus of the present invention.
Figure 2:
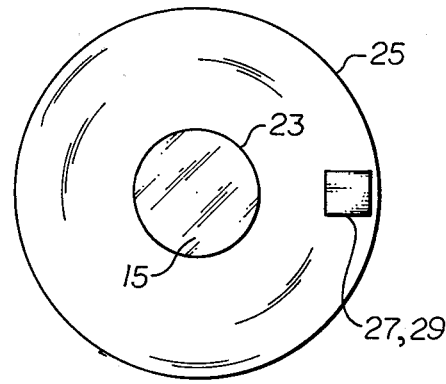
FIG. 2 is an end view of the apparatus of FIG. 1.

Referring to FIG. 1, the resonator portion of a laser is shown generally at 11. The resonator forms the gain region 12 of the laser, in which the propagating laser beam increases in power and amplitude by virtue of several passes between the mirrors defining the gain region before it is propagated out of the laser. The resonator 11 comprises a concave mirror 13 and a convex mirror 15 which are symmetrical about a laser axis 17, on which the propagating laser beam initially appears.

Since the two mirrors are concave and convex, the laser beam, in its passes through the gain region, will move with parallel wavefronts in the direction of convex mirror 15 and divergent wavefronts in the direction of concave mirror 13. After several passes between the mirrors 13 and 15, the beam proceeds out of the laser. Such an arrangement is referred to as an unstable resonator.

The laser beam increases in amplitude and power with each pass through the lasing medium, in gain region 12, in accordance with conventional lasing principles. With each pass, the diameter of the propagating beam will increase in the diameter by the ratio of the focal length of the two mirrors i.e., the ratio of distance 19 to distance 21. After several passes, the beam will strike concave mirror 13 at a location from which it comes out along a line which does not intersect mirror 15. This beam, e.g. lines 14—14 in FIG. 1, then proceeds out of the laser.

In the embodiment shown, concave mirrors 13 and 15 are circular, with concave mirror 13 being approximately three times the size of convex mirror 15. The beam directed out of the laser will thus be in the shape of a torus, defined by the peripheries 23, 25, of mirrors 15 and 13, respectively.

The apparatus of the present invention, shown schematically in FIG. 1 as elements 27 and 29, selects desired spectral lines of the emitted radiation from resonator 11, and reflects them back into the resonator along the propagation gain path. The remaining spectral lines, which are not desired because they are the ones absorbed by the atmosphere, are either absorbed or directed along a different path.

The apparatus of the present invention shown schematically in FIG. 1 may take several configurations. For instance, element 27 may be a frequency responsive device such as a conventional multiple band pass filter tuned to the desired spectral lines, allowing the desired spectral lines to pass through, or it may be a series of cell absorbers, with each absorbing cell being constructed to absorb one or more undesired spectral lines, again permitting the desired spectral lines to pass through.

The retroreflector 29 may be a conventional cubecorner reflector, which is one corner of a cube and which produces a reflected beam which is always parallel to the incident beam. Such elements as band pass filters and cell absorbers are well known in the art and commercially available. The selection of particular ones of those elements will depend upon the particular spectral lines which are to be passed and absorbed.

Figure 5:
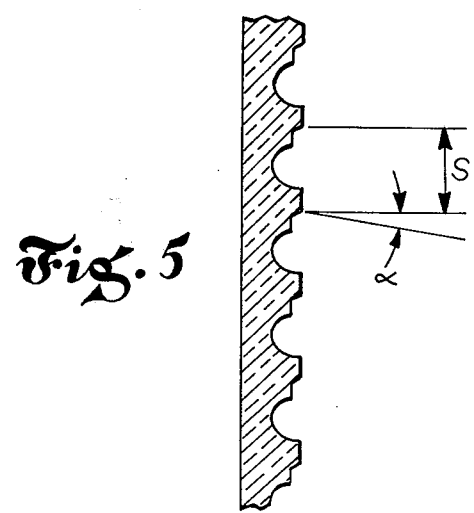
FIG. 5 is a cross section view of a portion of a grating useful in the apparatus of the present invention.

Alternatively, the frequency responsive device may be combined with the retroreflector in a single device, such as a diffraction grating, which is constructed and positioned so as to reflect only the desired spectral lines back into the resonator along the propagating gain path. A close-up, cross-section of a grating is shown in FIG. 5. Such gratings are explained in more detail in "Concepts of Classical Optics", by John Strong, published by W. H. Freeman Co., 1958.

The selection and reflector structure of FIG. 1 occupies only a portion of the area between peripheries 23 and 25 of mirrors 15 and 13, so that only a select portion of the radiation from the resonator will impinge upon the selection medium 27. A selection apparatus covering approximately 5% of the beam area has been found to provide good results, while a range of 1/10% to 10% has been found satisfactory.

Referring still to the apparatus of FIG. 1, in operation, the propagated laser beam from resonator 11 will impinge upon the line selection medium 27, which, depending upon the design approach in a particular application, will either select desired spectral lines from the beam spectrum and pass them to the retroreflector 29, or eliminate undesired spectral lines, passing the remaining desired spectral lines to retroreflector 29. The desired spectral lines will then be reflected back along the path of propagation of the beam, referred to as the gain path, toward laser axis 17.

The returning beam, comprising the reflected desired spectral lines, will then couple by defraction to the propagating beam near the laser axis 17. This results in the vibrational and rotational transition states which are responsible for producing the lasing effect tending to be monopolized by the desired spectral lines, i.e. at the desired spectral frequencies, while the undesired spectral lines, which of course compete for the available molecular species with the desired spectral lines, will tend to decrease.

The laser thus will tend to lock, operationally, onto the desired spectral lines, thus resulting in an elimination of the undesired spectral lines from the overall output spectrum. The output energy of the laser will thus tend to be concentrated at the desired spectral lines. An explanation of the phenomenon of laser injection locking may be found in an article by Carl J. Buczek, Robert J. Freiberg and M. L. Skolnick appearing in the Proceedings of the IEEE, vol. 61, No. 10, Oct. 1973, entitled: Laser Injection Locking.

Figure 3:
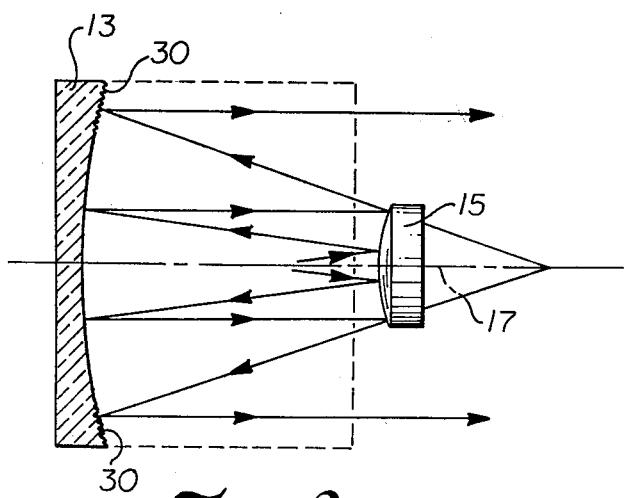
FIG. 3 is a side elevation view of the gain region of a laser, in combination with one embodiment of the present invention.

As noted above, the functions of selecting particular spectral lines and reflecting those spectral lines back into the resonator 11 may be accomplished by a single structure, as shown in FIG. 3. FIG. 3 shows an unstable resonator similar to that of FIG. 1, except that a diffraction grating 30 is located at the periphery of the concave lens 13. Although the preferred location of the grating in the embodiment of FIG. 3 is at the periphery, the grating can be located closer to the laser axis 17.

The diffraction grating in the embodiment of FIG. 3 forms a concave mirror 13. Like other diffraction gratings, the grating of FIG. 3 has a periodic surface configuration, somewhat like a waveform, such as that shown in FIG. 5. The grating may be either an amplitude or a phase grating, with the grating period or spacing S being defined as follows: $S = \lambda_n / 2 \sin \alpha$, when $n = 1, 2 \ldots N$; where $\lambda_n$ is the wavelength of the particular spectral line selected, and $\alpha$ is the angle of incidence of the laser beam at the grating. The spacing S may be increased without detriment to the function of the grating by a factor of M, where M is an integer.

Gratings can be manufactured in a known number of ways, among them being photo etching, diamond ruling or by an ion beam. A simulated grating may be made through holographic techniques. The holographic technique is explained in more detail in the May-June 1975 edition (Volume 14, #3) of Optical Engineering, at page 208, in an article by W. Braun titled, "A Method to Measure Pulsed Infrared Laser Spectra By Means of Holography."

A single line grating would be relatively easy to manufacture, as the waveform for the spectral line being selected is etched in the mirror as shown. Multiline gratings are, however, more complicated to construct. A multiline grating is required to simultaneously select more than one spectral line, which is normally necessary in a given application. Multiline gratings are manufactured by superimposing the waveforms for each desired spectral line into a complex profile. This complex profile is then etched into the base surface, and forms the multiline grating. The number of grating lines for each spectral line may vary, although the resolution of the grating will depend directly on the number of grating lines, i.e. the more grating lines the narrower the selection capability of the grating.

Figure 4:
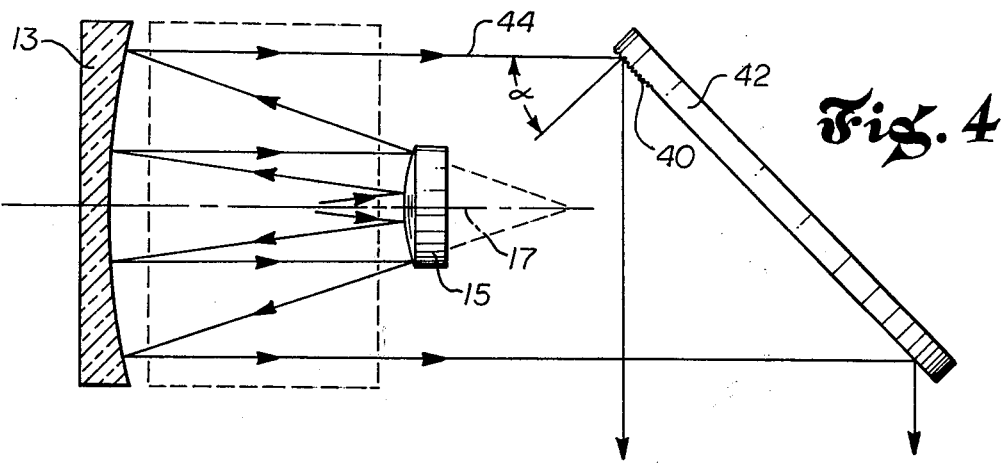
FIG. 4 is a side elevation view of the gain region of a laser, in combination with an alternative embodiment of the present invention.

Another embodiment utilizing a diffraction grating is shown in FIG. 4. In this case, the grating 40 forms a portion of a folding mirror 42, which is located at a specified angle outside of the resonator. The folding mirror and the multiline diffraction grating therein are arranged such that a portion 44 of the propagating beam from the laser strikes the grating 40 at an angle $\alpha$. The grating has the correct configuration to reflect the selected lines back into the resonator, as is done in the embodiment of FIG. 1, while the undesired spectral lines are directed elsewhere. The configuration of the grating is established in accordance with the principals discussed above with respect to FIG. 3.

Hence, with the apparatus of the present invention, one or more spectral lines of a laser spectrum may be selected and fed back into the laser so that the laser locks up on those lines. The undesired spectral lines, which are those absorbed by the atmosphere, are thus significantly reduced or eliminated. By reducing or eliminating those spectral lines which are absorbed by the atmosphere, virtually all of the laser output energy will reach the target, thus providing maximum intensity at the target, and increasing laser efficiency.

Althougth a preferred embodiment of the invention has been disclosed herein for purposes of illustration, it should be understood that various changes, modifications and substitutions may be incorporated in such embodiment without departing from the spirit of the invention.

For instance, it should be understood that, although the disclosure has been in terms of selecting those lines which are not absorbed by the atmosphere, other spectral line selection criteria can also be readily implemented with the present invention. The invention is defined by the claims, which follow.

What is claimed is:

1. An apparatus for locking the spectral output of a laser which includes a laser resonator to selected spectral lines, comprising, multi-line diffraction grating means formed in one mirror of the laser resonator, positioned so that a propagating laser beam which has made a number of passes along a gain path in the laser resonator impinges thereon, for selecting at least one spectral line from the frequency spectrum of the laser beam and reflecting said one spectral line back into the resonator along the gain path.

2. An apparatus of claim 1, whererin said selecting and reflecting means includes means for simultaneously selecting and reflecting more than one spectral line from the spectrum of the laser beam.

3. An apparatus of claim 1, wherein said selecting and reflecting means is positioned outside of the laser resonator.

4. An apparatus of claim 3, wherein said selecting and reflecting means has such a size and is so positioned that approximately only 1/10%–10% of the propagating laser beam is reflected back into said resonator along said gain path.

5. An apparatus of claim 4, wherein said selecting means is a frequency selective device, and wherein said reflecting means is a retroreflector.

6. An apparatus of claim 1, wherein the spacings of said diffraction grating is equal to $[\lambda_n/2\sin\alpha]\cdot m$, where $\lambda_n$ is equal to the frequency of the laser beam, m is an integer, and $\alpha$ is the angle of incidence of the laser beam on the diffraction grating.

* * * * *